United States Patent [19]
Dent

[11] Patent Number: 6,112,094
[45] Date of Patent: Aug. 29, 2000

[54] ORTHOGONAL FREQUENCY HOPPING PATTERN RE-USE SCHEME

[75] Inventor: Paul W. Dent, Pittsboro, N.C.

[73] Assignee: Ericsson Inc., Research Triangle Park, N.C.

[21] Appl. No.: 09/055,262

[22] Filed: Apr. 6, 1998

[51] Int. Cl.$^7$ ................................................. H04Q 7/20
[52] U.S. Cl. .................... 455/452; 455/450; 455/410; 375/132; 375/134
[58] Field of Search ................................. 455/447, 450, 455/464, 509, 446, 448, 449, 442, 452, 62, 63, 453, 410; 375/132, 134; 370/335, 320, 342, 441

[56] References Cited

U.S. PATENT DOCUMENTS

| | | | |
|---|---|---|---|
| 4,476,566 | 10/1984 | Dent | 375/1 |
| 4,639,548 | 1/1987 | Oshima et al. | 380/43 |
| 5,287,384 | 2/1994 | Avery et al. | 375/202 |
| 5,375,140 | 12/1994 | Bustamante et al. | 375/206 |
| 5,425,049 | 6/1995 | Dent | 375/202 |
| 5,463,659 | 10/1995 | Nealon . | |
| 5,539,730 | 7/1996 | Dent | 370/29 |
| 5,555,257 | 9/1996 | Dent | 370/95.1 |
| 5,566,168 | 10/1996 | Dent | 370/50 |
| 5,568,088 | 10/1996 | Dent et al. | 330/151 |
| 5,574,967 | 11/1996 | Dent et al. | 455/12.1 |
| 5,594,941 | 1/1997 | Dent | 455/13.4 |
| 5,619,210 | 4/1997 | Dent | 342/352 |
| 5,619,503 | 4/1997 | Dent | 370/330 |
| 5,631,604 | 5/1997 | Dent et al. | 330/124 R |
| 5,631,898 | 5/1997 | Dent | 370/203 |
| 5,638,024 | 6/1997 | Dent et al. | 330/84 |
| 5,642,358 | 6/1997 | Dent | 370/323 |
| 5,729,538 | 3/1998 | Dent | 370/347 |
| 5,751,761 | 5/1998 | Gilhousen | 375/200 |
| 5,862,142 | 1/1999 | Takiyasu et al. | 370/480 |
| 5,943,331 | 8/1999 | Lavean | 370/335 |
| 5,987,014 | 11/1999 | Magill et al. | 370/335 |
| 5,995,533 | 11/1999 | Hassan et al. | 375/200 |

FOREIGN PATENT DOCUMENTS

| | | |
|---|---|---|
| 189695 | 8/1986 | European Pat. Off. . |
| 0756395 | 1/1997 | European Pat. Off. . |
| 2101847 | 1/1983 | United Kingdom . |
| 2300547 | 11/1996 | United Kingdom . |
| 2337699A | 3/1999 | United Kingdom ........... H04B 17/13 |
| WO93/17507 | 9/1993 | WIPO . |
| 9600467 | 1/1996 | WIPO . |

OTHER PUBLICATIONS

Torrieli, D.; Cellular frequency hopping CDMA systems, Vehicular Technology Conference, 1999 IEEE 49th, pp. 919–925 vol. 2, May 16, 1999.

McNair, B.; Cimini, L.J., Jr.; Sollenberger, N.; A robust timing and frequency offset estimation scheme for orthogonal frequency division multiplexing (OFDM) systems; Vehicular Technology Conference, 1999 49th, pp. 690–694 vol. 1, May 16, 1999.

van de Beek, J.J.; Sandell, M.; Borjesson, P.O.; ML estimatin of time and frequency offset in OFDM systems; IEEE transactions on Signal Processing, pp. 1800–1805, Jul. 1999.

Bar–Ness, Y.; Linnartz, J–P.; Xiangqun Liu; Synchronous multi user multi carrier CDMA communication system with decorrelating interference canceler, 5th IEEE International Symposium on Personal, Indoor and Mobile radio Communications, 1994 Wireless Netwo, Sep. 18 , 1994.

International Search Report re RS 100931 Date of mailing of search: Nov. 20, 1998.

*Primary Examiner*—Dwayne D. Bost
*Assistant Examiner*—Sonny Trinh
*Attorney, Agent, or Firm*—Wood, Phillips, VanSanten, Clark & Mortimer

[57] ABSTRACT

Frequency hopping techniques which provide greater interference averaging are described. Cells having the same hopping sequence select sequence offsets pseudo-randomly in a manner which ensures that stations within cells select different channel frequencies, but also that as between such cells, interferers change between hops. This can be accomplished by, for example, providing each station with a unique identifier that can be used in conjunction with a pseudo-random number to select from the set of hopping sequences assigned to the cell.

11 Claims, 8 Drawing Sheets

ORTHOGONAL FREQUENCY HOPPING PATTERN RE-USE SCHEME

BACKGROUND

The invention relates to land-based or satellite-based radio telephone systems using frequency hopping and methods to reduce interference between cells using the same frequencies at the same time.

In British Patent No. 8118954, and corresponding U.S. Pat. No. 4,476,566 to Applicant entitled "Frequency Hopping Radio Communications Apparatus Having Pseudo-Random Channel Selection", an orthogonal frequency hopping channel selection method is described that permits a radio station within a given group to select, for successive transmission intervals, a random channel to use for communication. At the same time, this method provides that different stations of the same group select different channels during the same interval and thus do not interfere with one another. The above patents are hereby incorporated by reference herein. This method of channel selection is termed "Orthogonal Frequency Hopping" as opposed to "Random Frequency Hopping" in which each station selects a channel at random and thus has a random chance of selecting the same channel as another station. These systems make it difficult, if not impossible, to deduce the particular channel that a second station will select based on the channel selected by a first station, except for the fact that it will be different. This feature of conventional orthogonal frequency selection teachings was useful in military applications in which it was desirable to hinder deliberate jamming by an enemy.

One application of the current invention is a civilian application such as cellular radio telephony. In cellular radio telephony, service of as many mobile telephone users as possible with a limited number of radio channels is desirable. The available radio channels are re-used many times over across a continent to achieve the required capacity, but conventional techniques assign channels to geographical cells such that adjacent cells do not use the same channel, thus avoiding excessive interference. The concept of frequency re-use involves dividing the total number of frequency channels into a number M of subgroups, and allocating each of the m subgroups for use in a cell according to an M-cell reuse pattern, such that cells allocated the same subgroup are separated by root(M) cell diameters between cell centers. The larger M is selected to be, the greater the distance between cochannel interfering stations; however fewer channels are available for use in each cell. Thus interference is reduced at the expense of capacity, so it is desirable to discover other ways of rendering interference more tolerable than by increasing the size M of the re-use pattern.

Conventional fixed frequency re-use patterns have the characteristic that a given station in one cell always suffers cochannel interference from another given station in another cell that is assigned the same channel. The interfering station may sometimes be a station near the station with which it is in communication (thus using a low transmission power), but on other occasions it may be a station using maximum power. Since the interference situation prevails for the duration of a cellular telephone call, it is necessary to plan to be able to cope with worst case situations, and so conventional fixed frequency reuse plans tend to be over-conservative.

Another method that provides an improvement over fixed frequency re-use plans is the frequency hopping method specified for the European cellular system known as the Global System for Mobile communications (GSM). In GSM, the subgroup of frequencies assigned for use within a particular cell is not divided to provide a single, unique frequency for each station in the cell, but rather each station is programmed to select a frequency at random from the entire subgroup according to an orthogonal frequency selection process. The stations within a first cell are thus "orthogonal" to one another, and have no frequency overlap with adjacent cells using different frequency subgroups. In a second cell that is assigned the same group of frequencies as the first cell, the stations are again orthogonal to one another but are conditioned to perform orthogonal frequency selection according to a pseudo-random selection algorithm different from that of the first cell, such that a station in the first cell is not always interfered by the same station in the second cell, but one of the stations in the second cell selected at random from one interval to the next. When selecting a station at random there is a 50% probability of its transmission being silent due to voice or data traffic activity factor, therefore the incidence of frequency clashes is reduced on average by 50% and the probability of a clash is uncorrelated from one interval to the next. Moreover, the power level of a clash varies depending on whether the interfering station is using high or low transmit power. By interleaving error-correction coded data frames over several consecutive frequency hop intervals, data can still be decoded satisfactorily with a random percentage of hops interfered more strongly than average. Thus GSM's frequency hopping provides interferer averaging, allowing the reuse pattern size M to be reduced compared to the value of M that would be needed to survive worst case interference. This translates to an increase in the number of calls that can be handled, i.e. capacity.

An improvement to frequency hopping of the GSM type is disclosed in U.S. Pat. No. 5,425,049 to Applicant, entitled "Staggered Frequency Hopping Cellular Radio System". This patent, which is hereby incorporated by reference herein, discloses an advantage in deliberately offsetting the timing of frequency hopping intervals between cells that are assigned to hop over the same subgroup of channels. When the timing offset is a fraction, such as ⅓rd of the hop interval, clashes with different interfering stations occur in each ⅓rd of the hop interval, thus providing even more interferer averaging.

Another benefit of frequency hopping is that it can average out frequency selective fading. If, due to multipath propagation, destructive interference occurs on some frequency channels, that situation will only occur at random on certain frequency hops and the outage event can be handled by the interleaving and error correction coding. To obtain the maximum gain against frequency selective fading, it is desirable to frequency hop over as many channels as possible. However, the number of channels used by any one cell were, in the aforedescribed conventional frequency hopping scheme, still a factor M less than the total number of channels available, with M on the order of 3 to 9. When practicing the current invention described below however, all stations may frequency hop over the entire number of channels available, thus achieving the maximum advantage against frequency selective fading.

In another application, a cellular radio telephone system is created with the aid of orbiting satellites equipped with multi-beam antennas, each antenna beam being associated with a geographical cell or service area on the ground. The geographical regions associated with a given satellite beam may be fixed, as when geostationary satellites or used, or moving satellite equipped with electronically steered beams; alternatively the geographical regions served by a particular satellite beam may be moving with the motion of the satellite in orbit round the earth. Nevertheless, within the appropriate moving or fixed frame of reference in which the beams are static, the need for inter-beam frequency reuse strategies can arise in order to control beam-to-beam interference. These matters are discussed in the following U.S. patents to Applicant, which are hereby incorporated by reference herein:

U.S. Pat. No. 5,642,358 entitled "Multiple beam width phased array";

U.S. Pat. No. 5,631,898 entitled "Cellular/satellite communications system with improved frequency re-use";

U.S. Pat. No. 5,619,503 entitled "Cellular/satellite communications system with improved frequency re-use";

U.S. Pat. No. 5,619,210 entitled "Large phased-array communications satellite";

U.S. Pat. No. 5,594,941 entitled "A cellular/satellite communications system with generation of a plurality of sets of intersecting antenna beams";

U.S. Pat. No. 5,566,168 entitled "TDMA/FDMA/CDMA hybrid radio access methods";

U.S. Pat. No. 5,555,257 entitled "Cellular/satellite communications system with improved frequency re-use"; and U.S. Pat. No. 5,539,730 entitled "TDMA/FDMA/CDMA hybrid radio access methods".

In one frequency band allocated for satellite communication to mobile phones, usage of the band is conditioned upon the average energy in any 4 KHz part of the frequency band reaching any square meter of the earth being below a specified limit. Thus narrowband communications systems that concentrate energy into a few, narrow channels would exceed the specified spectral density limit. Higher energy may be transmitted by using a spread-spectrum form of transmission such as Direct Sequence Spread Spectrum Multiple Access (DSSSMA), also known as Code Division Multiple Access (CDMA), or alternatively Frequency Hopping Spread Spectrum (FHSS). When FHSS is used, the frequencies used in any area, i.e. in that region of the earth served by a particular directive beam, should be hopped over the entire number of channels available in order to spread the energy density as thinly as possible, and not hopped over a subset of channels only. Nevertheless communications in adjacent beams should preferably not use the same channels at the same time. The need arises therefore for a frequency hopping system in which frequency selection is orthogonal within a cell and its adjacent cells, while in non-adjacent cells the probability of a frequency clash between any two given stations is preferably random and not an event of long duration. These requirements and improvements are achieved when practicing the inventive orthogonal frequency hopping system described herein.

SUMMARY

A frequency hopping cellular reuse scheme includes dividing a service area into a number of adjoining cells, each cell having associated frequency hopping, multiple transmission units for transmitting information to a plurality of stations located within the cell, and each cell having associated frequency hopping multiple reception units for receiving information from a plurality of stations in the cell.

Each of the plurality of stations has an associated frequency hopping receiver for receiving one of the multiple transmissions and a frequency hopping transmitter for transmitting information to the multiple reception units. Each frequency hopping receiver or transmitter has a time-of-day clock or counter for indicating the number of a current transmission or reception interval, such as a Time Division Multiple Access frame number, a slot number, a transmission burst number, or a packet number frequency hop number. The interval indicated is the interval for which a channel frequency for transmission or reception shall be selected and a channel is pseudo-randomly selected for each interval from a set of allowed channels, which set is referred to herein as called the hopset.

A first pseudo-random number generator computes a pseudo-random number for each interval based on the interval number and a system key common to all transmitters and receivers of the same system. The pseudo-random generator is constrained to produce a number indicating only one of the allowed channels that is contained in the hopset, and not a disallowed channel.

An orthogonal-offset modifier modifies the pseudo-random number by adding an orthogonal offset modulo the number of allowed channels such that the modified channel number is still an allowed channel of the hopset.

The number of possible orthogonal offsets is equal to the number of allowed channels in the hopset. The number of orthogonal offsets is partitioned into a number of sub-groups and each sub-group of orthogonal offsets is assigned for use in non-adjacent cells, while adjacent cells use different sub-groups. Thus stations in adjacent areas do not employ the same orthogonal offsets, but stations in non-adjacent cells can re-use the same sub-group of orthogonal offsets.

In the conventional frequency hopping described above, a first station in a first area being assigned the same hopset, system key and orthogonal offset as a second station in a second area would always select the same channel frequency at the same time, since their respective pseudo-random number generators are given identical input variables. Thus in these systems, cochannel interference occurs between stations on a one-on-one basis, which it is an object of this invention to avoid.

According to the present invention therefore, a second pseudo-random number generator is used to vary, within a first cell, the selection of orthogonal offset used by a first station from the subgroup of orthogonal offsets assigned to the first cell, the pseudo-random number generator being conditioned by a number unique to each station in the same cell and by a cell key that is different from the cell key used by a second cell assigned the same subgroup of orthogonal offsets. The second pseudo-random number generator ensures that a second station in a second cell that selects the same channel as a first station in a first cell is not always the same second station, but a random one of the stations in the second cell. By the above inventive scheme, interference averaging over all possible cochannel stations is achieved, half of which are likely to be silent during any interval as determined by voice or data traffic activity factors. Thus the incidence of cochannel interference is reduced by 50% with an uncorrelated probability of interference between successive intervals. Interleaved error correction coding of data or voice traffic is employed to allow such random cochannel interference events to be bridged.

BRIEF DESCRIPTION OF THE DRAWINGS

These and other features, objects and advantages of the present invention will be more readily understood by those skilled in the art when read in conjunction with the appended drawings, wherein.

DETAILED DESCRIPTION

Figure 1:
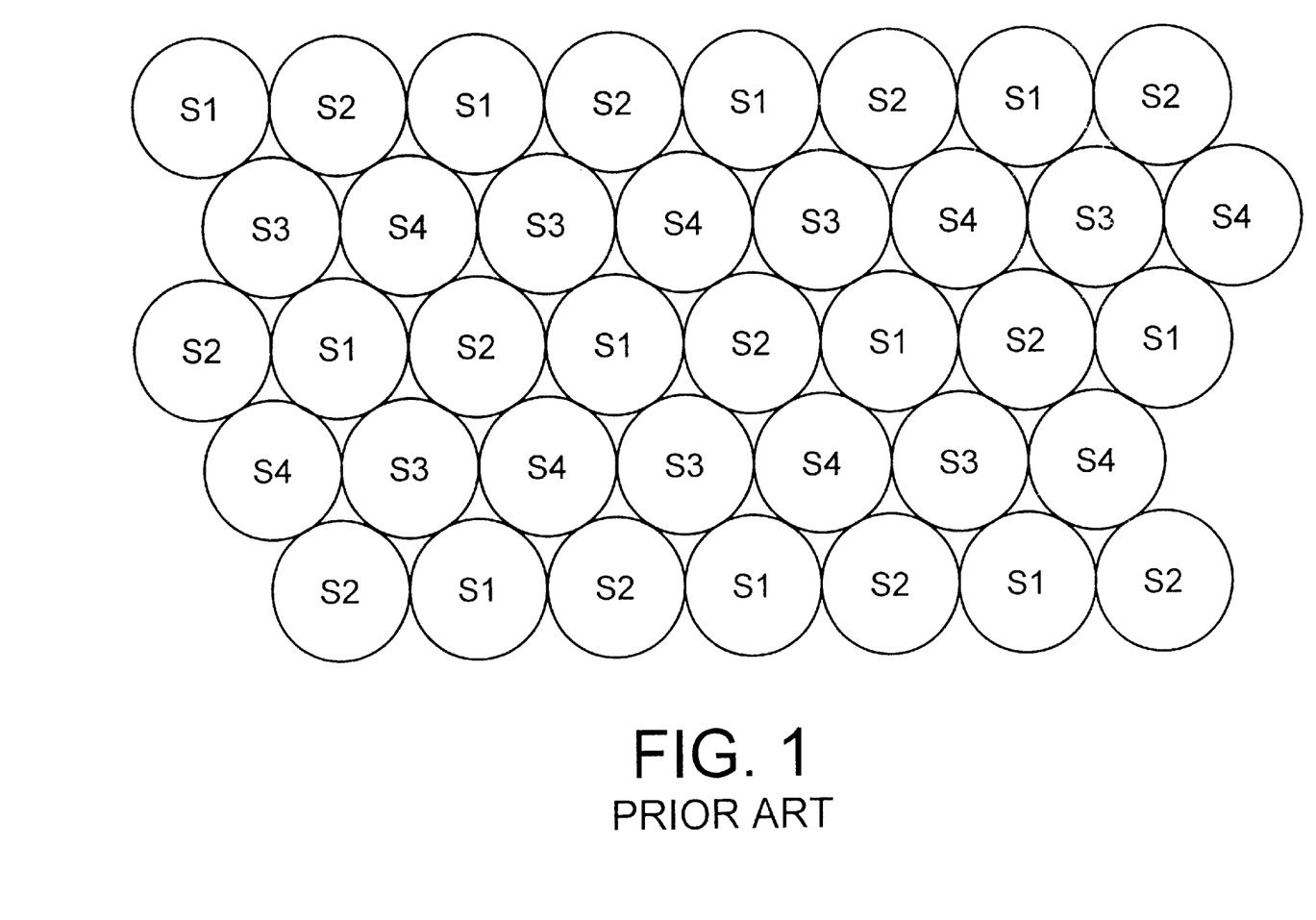
FIG. 1 shows a conventional four-cell reuse pattern of orthogonal sequences.

Referring to FIG. 1, a number of abutting circles representing cells are shown, each cell being labeled by S1, S2, S3 or S4, which symbols each stand for a particular subset of the total number of orthogonal frequency hopping sequences available that is used in the indicated cell. The cells may be wireless communications service areas served by land-based cellular base stations, or alternatively geographical areas of the earth that are each illuminated by a respective directional transmission beamed from an orbiting satellite.

A set of orthogonal frequency hopping (FH) sequences is any set of assignments of N channel frequencies to N communications links such that no two links use the same channel at the same time and the assignment of channel to link changes periodically for all links at the same instant. The period in which a particular assignment applies may be referred to as a "hop", and the time-period may, for example, be a TDMA frame period or a TDMA slot duration. In the GSM system, the frequency channel is assigned for all timeslots in the TDMA frame, and changes only once per frame. The FH sequence is therefore the same for all timeslots in the same frame. However, it is equally possible to consider each timeslot in the frame to frequency hop in a sequence unrelated to the sequence of hopping in other time slots. In one exemplary embodiment of the current invention, it is advantageous to use different frequency hopping patterns for each time slot.

Figure 2:
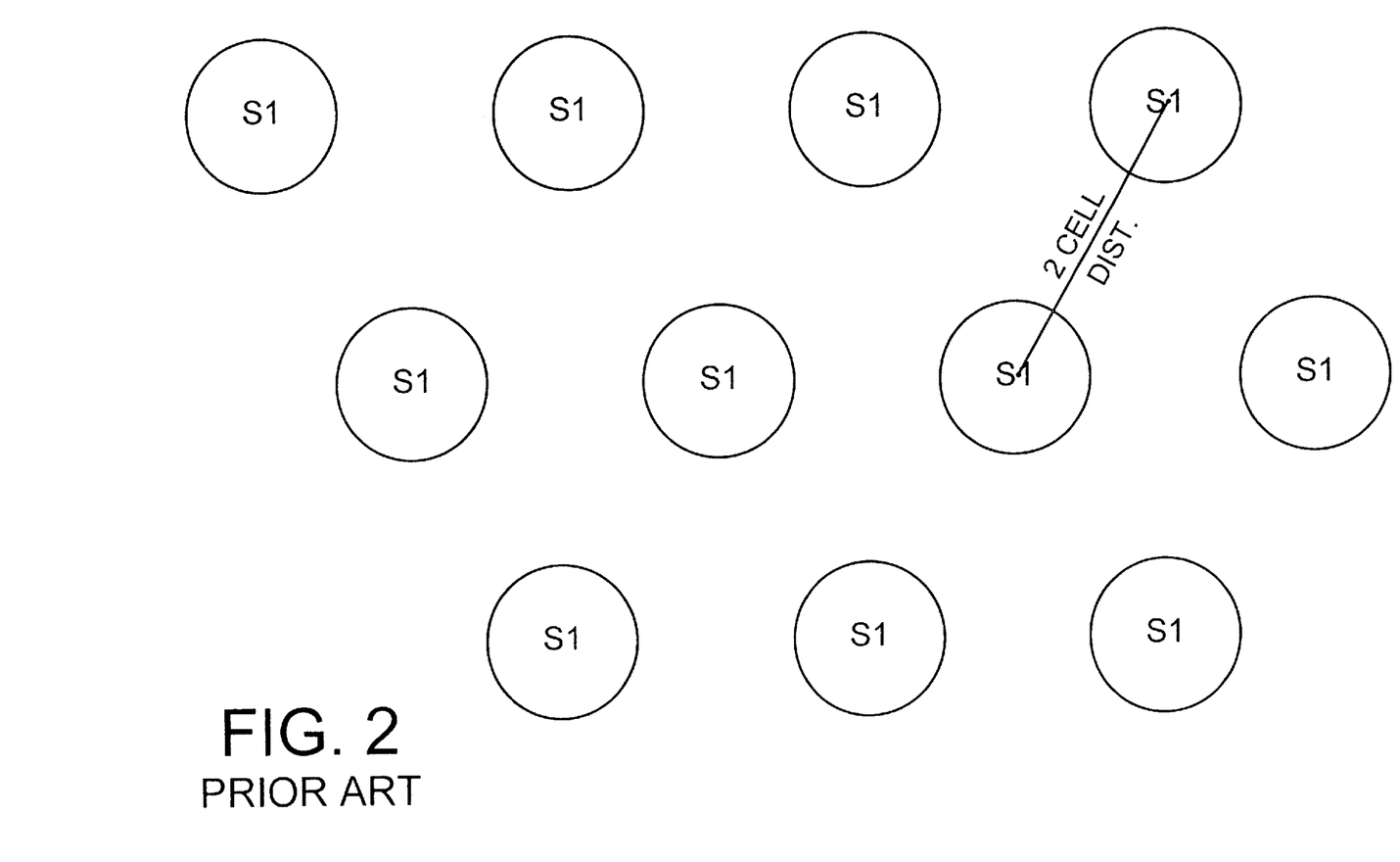
FIG. 2 shows only cells that use the same orthogonal sequences.

For example, if there are 59 channel frequencies available, a set of 59 orthogonal frequency hopping sequences can be constructed. These would be divided into four, not necessarily equal subsets, such as 10 sequences in S1, 20 in S2, 15 in S3 and 14 in S4. The division would preferably reflect the relative demand for communications in the cells using the different subsets. When the subsets are assigned to cells as in FIG. 1, it is seen that adjacent cells use different orthogonal sequences and do not therefore mutually interfere. Cells two apart however use the same orthogonal sequences again. FIG. 2 shows only the cells that use a particular subset of sequences, the S1 subset. Re-use occurs, in this example, on a regular grid pattern with a spacing of two cells. As is well known from cellular radio telephone technology, regular re-use patterns may be constructed for assigning channels to cells if the channels are divided into M subgroups, where M is any integer of the form $$i^2 + j^2 - ij,$$

where 'i' and 'j' are integers.

The center-to-center distance between cells using the same channel is then root(M) cell diameters. According to this invention, orthogonal sequence subsets are assigned in a similar manner using a re-use pattern which may be a regular re-use pattern of the above sort, or alternatively an irregular re-use pattern, the need for which sometimes arises when cells are not all of the same size but of various diameters. The aim is however the same, i.e., to assign the subset of sequences such that the distance between areas using the same subset is maximized, so that interference minimized.

Figure 3:
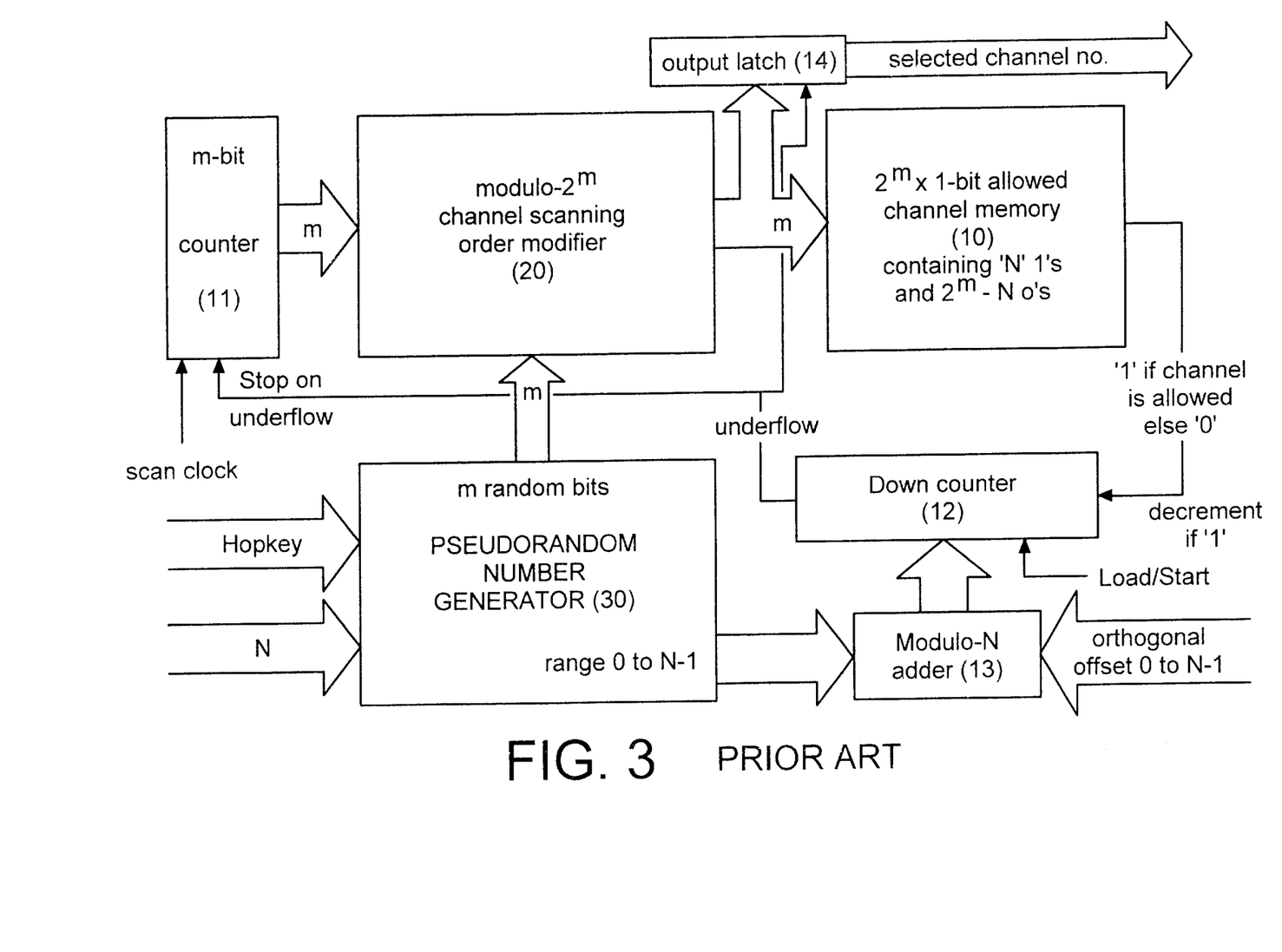
FIG. 3 shows the orthogonal frequency hopping sequence generator of above-incorporated U.S. Pat. No. 4,476,566.

FIG. 3 shows an orthogonal sequence generator according to the above incorporated prior art described in U.S. Pat. No. 4,476,566. Therein, a pseudo-random number generator (30) generates pseudo-random digits under control of a "Hopkey". In a military anti-jamming application of frequency hopping, the Hopkey is a secret code without which an enemy can not generate the random sequence, and so cannot anticipate which frequency will be used next. One output of generator (30) is constrained to lie with the range 0 to (N−1) so that it indicates which one of a number N of channels, numbered zero to N−1, is selected. Prior to use however, the number (between 0 and N−1) is modified by adding an orthogonal offset in adder (13), the offset also being in the range 0 to N−1 and the result being reduced modulo-N to still lie in the range 0 to N−1. The result of modulo-N adder (13) is to be used to select one of the allowed N channels.

The N allowed channels may not comprise all available channels. Some channel frequencies may be taken up for other uses, for example, for a non-hopping broadcast control channel, or for a microcell system embedded within a macrocell system. Therefore some means is required to indicate which channels constitute the allowed channels. In the patent referred to above, a memory having 1 binary bit per channel was programmed with a '1' if the channel was allowed and a zero otherwise. When the number of channels potentially available is large, this can be a memory-efficient way to store hopsets. An alternative would be to store in a multi-bit memory only the channel codes of the allowed channels. The latter is efficient when the number of allowed channels is expected to be a small fraction of the total number of channels.

In the former method, having obtained an output "L" from adder (13), it is now desired to locate the L'th '1' in memory (10). This is done by loading downcounter (12) with "L", resetting counter (11) to zero, and using counter (11) to generate an address to memory (10). If the addressed bit of memory (10) is a 111, indicating that the addressed channel is an allowed channel, downcounter (12) is decremented; else, if the addressed bit is a '0', indicating that the addressed channel is not an allowed channel, it is ignored. Thus upon incrementing counter (11) through all its states to scan the bits of memory (10), downcounter (12) will only decrement upon encountering an allowed channel. When downcounter (12) has decremented through zero, generating an underflow pulse output, it indicates that the L'th allowed channel has been addressed. The underflow pulse is used to latch the memory address in latch (14) to provide an output of the channel found.

Different orthogonal sequences are guaranteed by allocating different orthogonal offsets to different links for supply to the input of adder (13). The different links should however use the same Hopkey and N value so that generator (30) produces the same number to adder (15) before modification. If this number is the same for all stations it can be guaranteed that adding different offsets produces a different number.

In military applications it was desirable to avoid being able to deduce the frequency of one link from the frequency of another link. For example, if a link using orthogonal offset 5 produces frequency channel 37 at a given instant, it could be that orthogonal offset 6 used by another link would produce channel number 38. To avoid such a simple relation, channel scanning order modifier (20) was used in the prior art to alter the order in which the allowed channels in memory (10) were addressed from one hop period to the next, in dependence on another pseudo-random output of 'm' bits for example from generator (30).

Figure 3A:
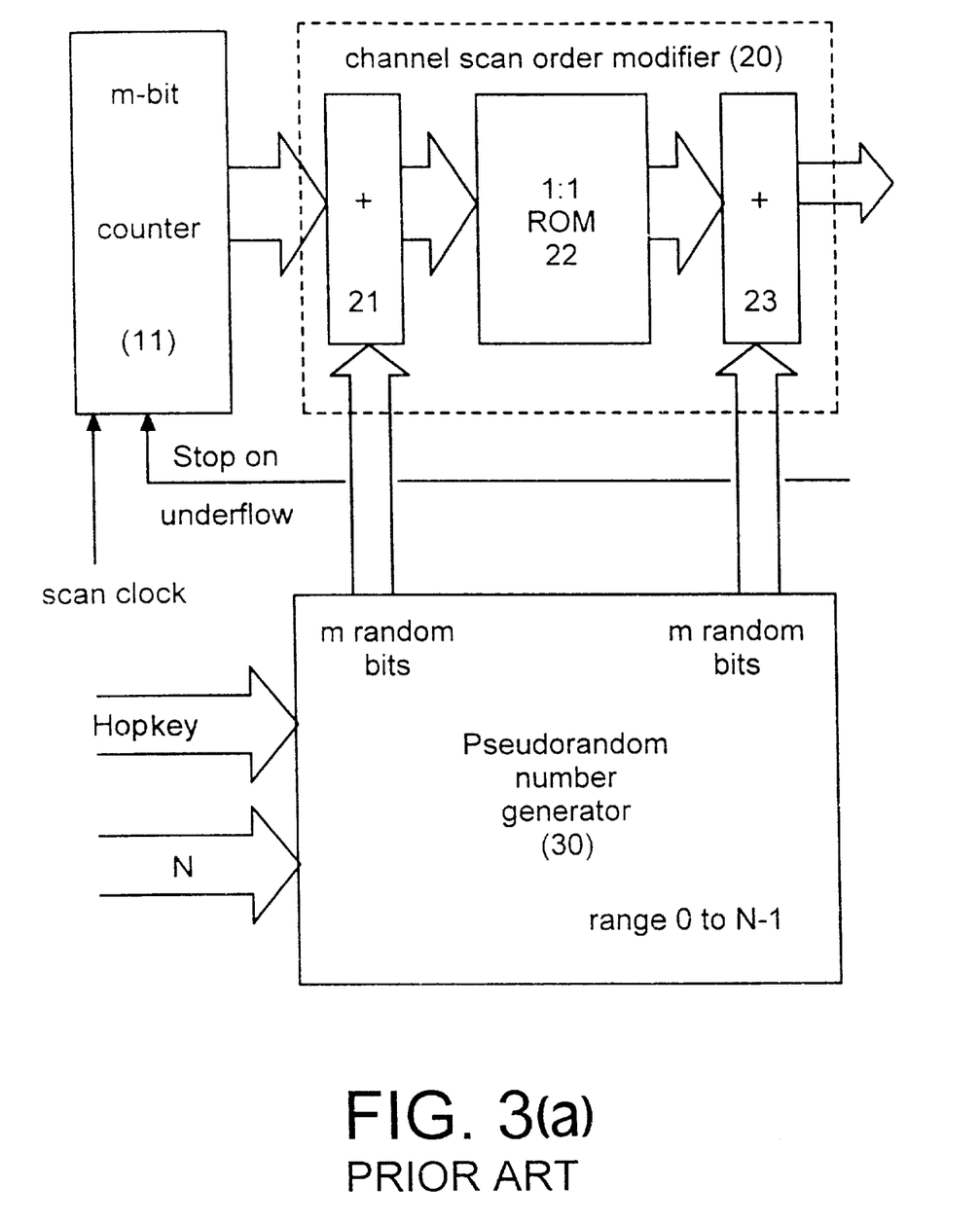
FIG. 3(a) shows a conventional channel-scanning order modifier suitable for use with this invention.

The 'm' bits could be modulo-2 added to the counter bits to scramble the scanning order, or could be used to control permuting more and less significant bits from counter (11), or a mixture of the two techniques. As seen in FIG. 3(*a*), an exemplary order scrambler (20) adds pseudo-random bytes (8 bits at a time) to bytes of scanning counter (11) to obtain modified bytes at block (21). Next, the modified bytes as passed through a 1:1 look-up table (22), also known as a substitution box or S-box. An S-box for substituting bytes can be obtained by using a Read Only Memory of 256 bytes, each possible byte value being stored only once in order to guarantee that the ROM is a 1:1 substitution. A many:1 substitution is not desirable, as certain output values would be missing, so certain addresses in memory (10) could never be scanned. Modulo-2 adder 23 improves the randomization compared to using modulo adder-21 and the 1:1 ROM alone.

Despite the above steps, when the cells of FIG. 2 are each allocated the same subset of the orthogonal offset to use (and the same Hopkey or system key, and the same N), then when a particular first station in a given first cell is assigned a given channel frequency, it will be always the same second station in a given second cell that is assigned the same channel. Thus there is a one-on-one interference situation between two cells of FIG. 2. The interfering station is sometimes active, when traffic is passing (e.g. a telephone caller is talking), and sometimes inactive (during speech pauses or if that orthogonal offset is not allocated to a call.) Thus, there will typically be fairly long periods of interference or non-interference, but it is necessary to plan for the worst case, i.e. that interference is always present.

According to the present invention, it is desired to avoid the one-on-one interfering situation between co-channel cells, by ensuring that it is not always the same interfering station in a second cell that interferes with a given station in a first cell. This is accomplished according to FIG. 4 by introducing a second pseudo-random number generator (31) to vary the assignment of orthogonal offsets to stations within a cell, and in a different manner for different ones of the cells of FIG. 2. For example, if there are 59 channels and therefore 59 orthogonal offsets in total, and subgroup S1 of comprises the 17 orthogonal offsets 43–59, the second pseudo-random number generator shall produce a number between 43 and 59.

Figure 4:
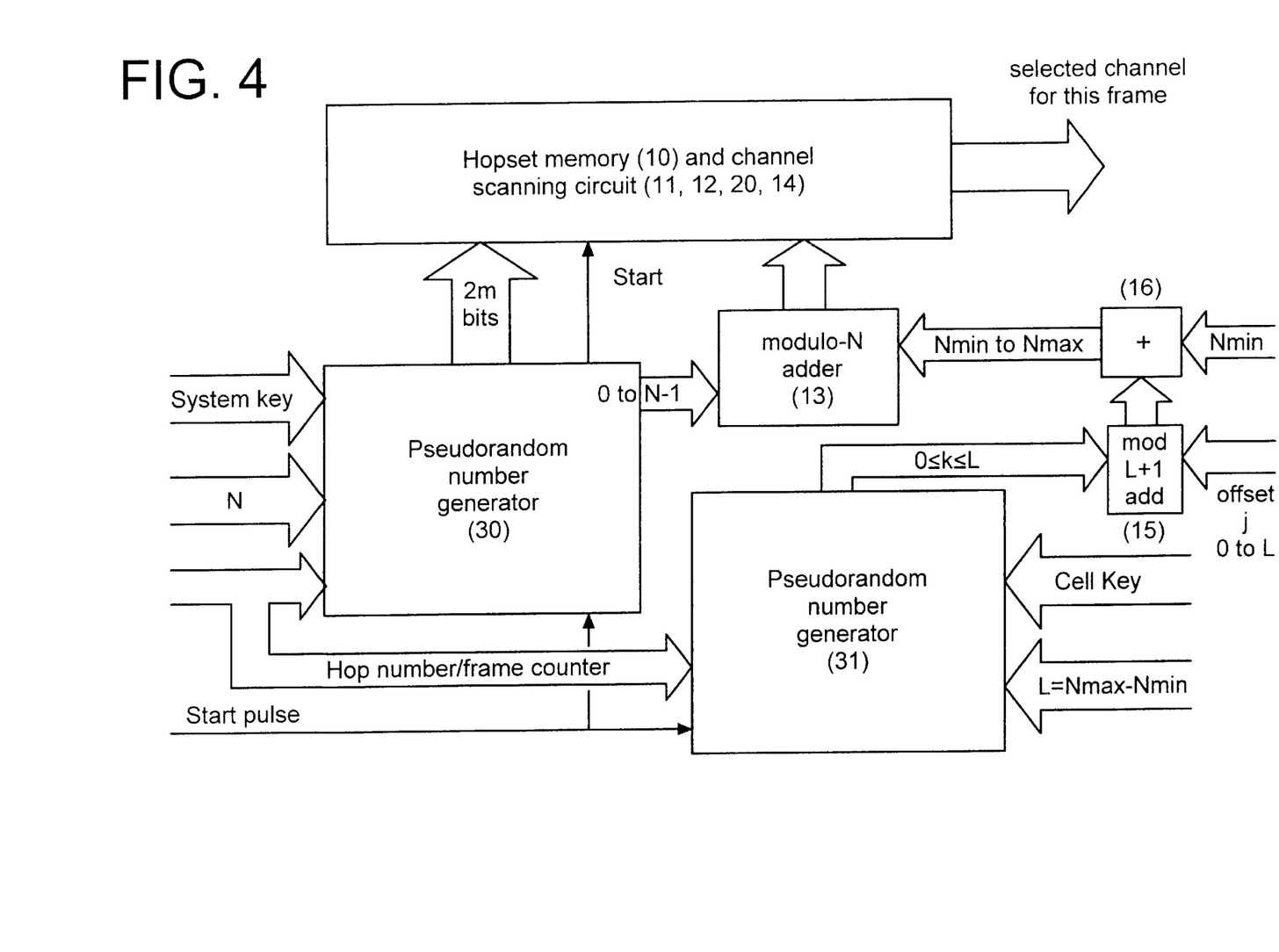
FIG. 4 shows introduction of a second pseudo-random number generator according to the present invention.

This is accomplished in the exemplary embodiment illustrated in FIG. 4 by producing a number in generator (31) between 0 and (Nmax−Nmin)=(59−43)=16, and then adding the base value Nmin=43 in adder (16). The pseudo-random number between 0 and Nmax−Nmin (e.g. 16) is first produced in the same way as pseudo-random number generator (30) produces a number between 0 and N−1, and this number will be identical for all stations within the cell by virtue of their using the same Cell Key to control generator (31). Then each station adds its own unique offset in adder (15) to produce a number guaranteed to be different for every station in the cell, thus ensuring that they use different ones of the orthogonal offsets assigned to the cell. The mobile station is assigned its own unique offset by a network control station at call set-up, from a list of presently unused offsets. The base value Nmin is then added at adder (16) to generate the selection from the total number of orthogonal offsets available to all cells. The selection is then applied to adder (13) as in FIG. 3.

In this way, it is ensured that stations within a cell still use a different one of the orthogonal sequences assigned to that cell, but the selection varies pseudo-randomly for different cells, e.g., of FIG. 2, even though they are assigned the same subset of sequences. Thus, the station in one cell that is an interferer to a station in another cell changes from hop to hop, and is sometimes an active station and sometimes an inactive station with a probability of 50% (for voice traffic). Thus interfering situations do not endure for the period a particular caller is speaking, but vary over the short term from hop to hop, which allows the interference to be averaged by the use of interleaved error correction coding.

Figure 5:
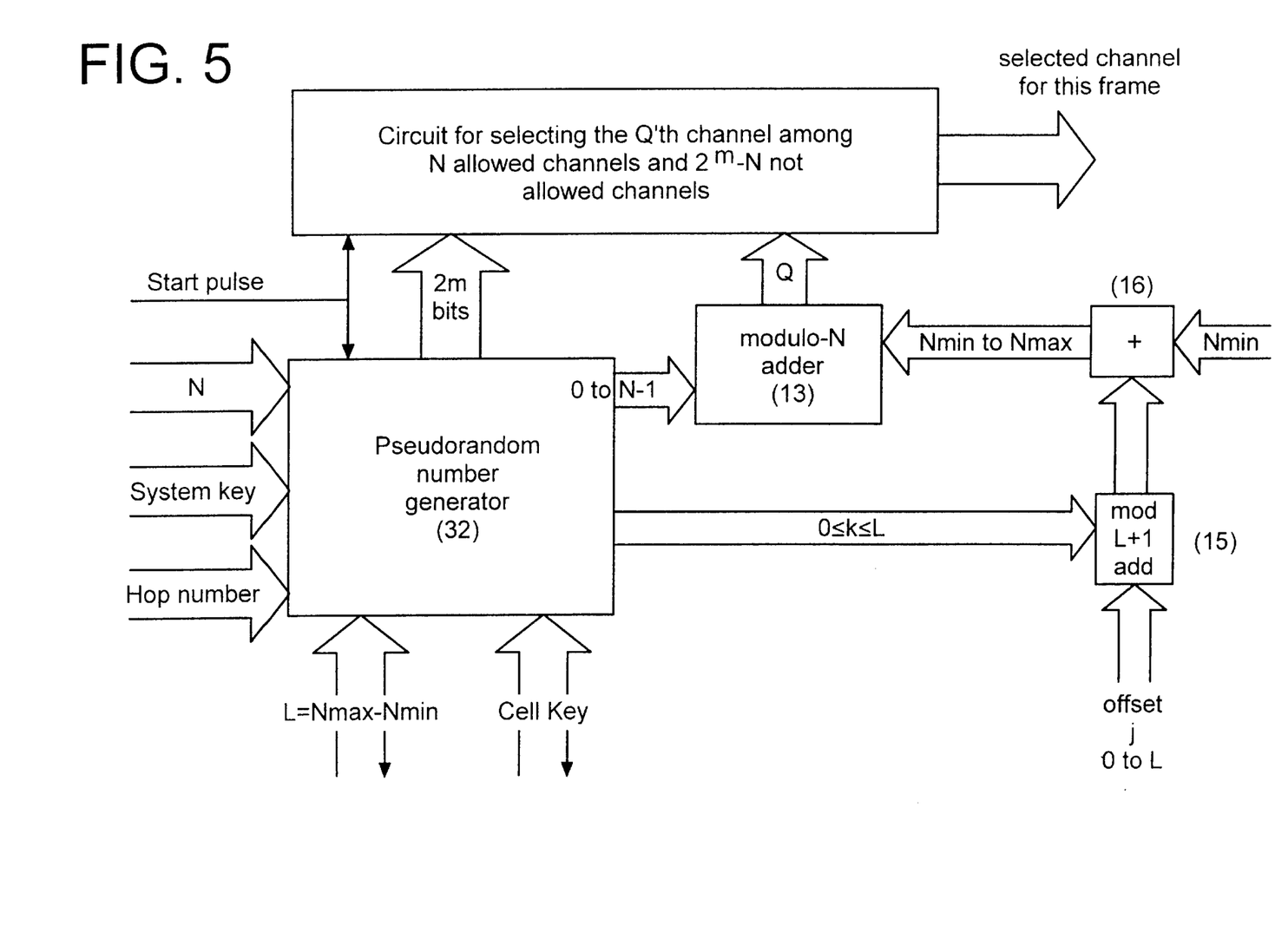
FIG. 5 shows a combination of the two pseudo-random generators according to this invention.

FIG. 5 shows an alternative embodiment of the present invention wherein the two PRN generators (30,31) of FIG. 4 are combined into a single PRN generator (32), which produces a first pseudo-random number only in dependence on a system key (and the range of the number N) and a second number that depends on a cell key (and on the number of orthogonal sequences assigned to the cell, and maybe also on the system key). Accordingly, those skilled in the art will appreciate that the additional interference averaging achieved by the present invention is not predicated solely on the provision of a second pseudo-random number generator, but on the capability to pseudo-randomly vary the orthogonal sequence selection as between cells.

Figure 6:
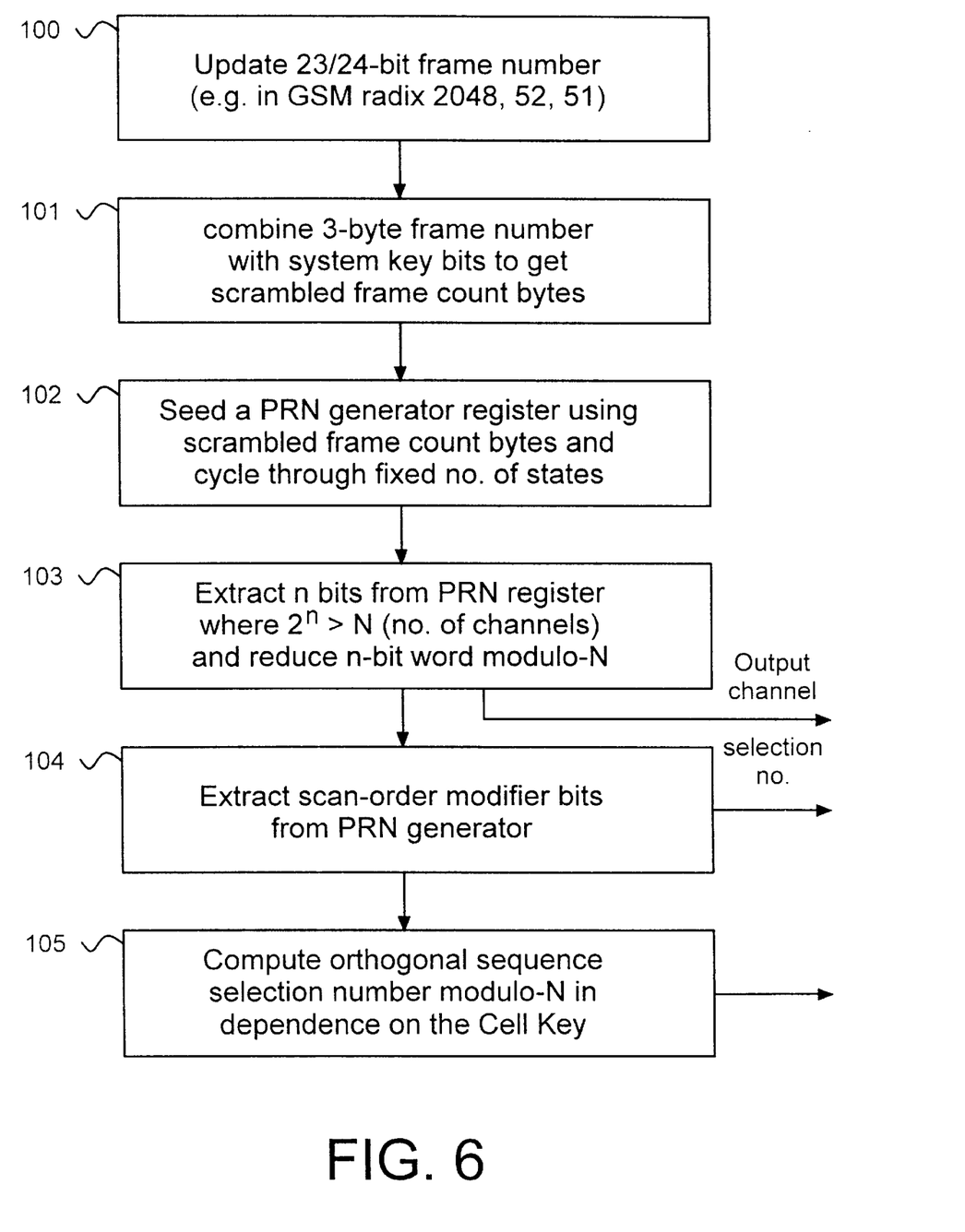
FIG. 6 is a flow chart of pseudo-random number generation suitable for this invention.

FIG. 6 shows a flow chart illustrating pseudo-random number generation for each hop interval. In the GSM system, a particular form of frame counter is used to count TDMA frames and superframes. A divide by 52 counter and a divide by 51 counter are incremented together, and on the one out of 51×52 occasions they both overflow together upon incrementing, a further 11-bit binary counter (divide-by 2048) is incremented. Together, these form a frame number in a mixed radix system of bases 51, 52 and 2048. Six binary bits are used to represent the number range 0 to 50, another six for the number range 0 to 52 and eleven for 0 to 2047, making 23 bits altogether. For simplicity, the frame count is just treated as a 3-byte (24-bit) time variable in this example. The above structure of a time variable is only exemplary and not meant to be limiting.

In FIG. 6, after incrementing the 3-byte time-variable at step 100, the bytes are scrambled with the system key bits at step 101 to obtain 3 or more scrambled time bytes that are a function of both unscrambled time bytes and system key bytes. These bytes are then used at step 102 to "seed" or initialize the register values of a PRN generator such as a feedback shift register. The PRN register is then shifted a fixed number of times by a shift clock to further scramble the contents. At step 103, a number 'n' of bits are extracted where 2n is greater than the number of channel frequencies N. The n-bit value is then reduced modulo-N by subtracting N until the result is less than N. At step 104, the 2n bits needed by scanning order modifier (20) are extracted and used. At step 105, the n-bit channel selection number is orthogonally modified using (13, 15, 16) in dependence on the cell key, which for example can be done by generating the further modifying number between 0 and L used by adder 15.

If necessary, use may be made of a known, efficient algorithm for reducing a quantity modulo-N in step 103. Since N is fixed for long periods, a finite word length approximation to its reciprocal 1/N can be precomputed and stored. To reduce the n-bit word modulo-N, it is then first multiplied by the approximate value of 1/N to determine approximately how many times N divides into the word.

Then N is multiplied by this number of times and subtracted from the N-bit word to leave a remainder. It may be shown that at most two more subtractions of N will suffice to obtain the modulo-N result, the process being thus much faster than subtracting N a large plurality of times.

Figure 7:
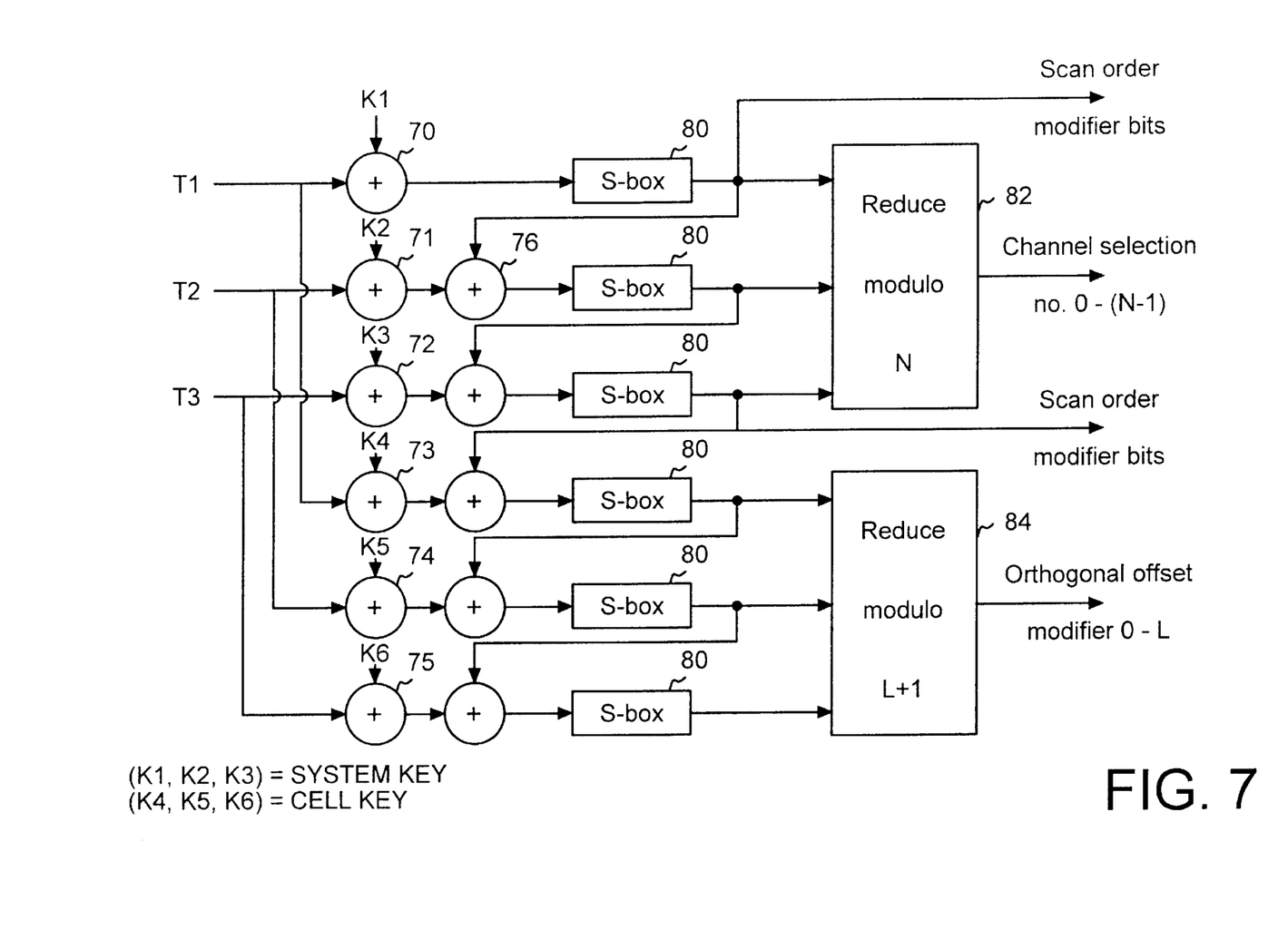
FIG. 7 shows a block diagram of a pseudo-random calculation.

The above modulo-N reduction method is useful when the word length 'n' of the quantity to be reduced is much greater than the minimum necessary to span the range 0 to N−1, which would then result in long modulo-2 reduction times by repeated subtraction. FIG. 7 shows another PRN generator which is practical using the fast modulo-reduction method.

Therein, the three time bytes are denoted T1, T2 and T3 and are added to system key bytes K1, K2, K3 in first adders 70–72, respectively, and to cell key bytes K4, K5, K6 in second adders 73–75, respectively. The adders may, for example, be either modulo-2 (byte-wide, bitwise Exclusive-OR) or modulo-256 adders, and the latter may operate with or without a carry input from a previous addition. The sum of T1 and K1 is passed through a 256-byte S-box 80 to scramble the result in such a way that a single bit change to T1 results on average in four bits of the output of the S-box changing. The output of the S-box 80 is added to the sum of T2 and K2 (at adder 76) and passed through the S-box 80 a second time, and so forth according to the exemplary data flow of FIG. 7. The three bytes from the first three applications of the S-box 80 are then modulo-N reduced in unit 82 to form an unmodified channel selection. Two of the bytes are also used for channel scanning order modification. The three bytes from the second three applications of the S-box are modulo-(L+1) reduced in unit 84, where L+1 is the number of orthogonal offsets assigned to the cell, in order to obtain the orthogonal offset modifier for adder (15) of FIG. 4 or 5. It will be appreciated that the processes described 8 above can be implemented using a programmable microprocessor with suitable software. Indeed, the byte-wide quantities shown facilitate implementation using 8-bit microprocessors such as a Zilog Z80, which are very economical in terms of power consumption in battery-operated handportable equipment.

In U.S. patent application Ser. No. 08/581,110, filed Dec. 29, 1995 (Dent, entitled "Timecompressing Transponder"), a satellite transponder was described for handling asymmetrical TDMA signals according to the above-incorporated U.S. Pat. No. 5,539,730 patent. Also, in U.S. Pat. No. 5,729,538 to Applicant, an interleaving and coding scheme was described for frequency-hopping transmission in which the coding of information could be varied according to the interference environment and capacity loading. The above applications are hereby incorporated by reference herein. The current invention is useful when practicing the above-incorporated art. A frequency hopping TDMA scheme according to this invention comprises coding information for transmission using a rate ⅓rd convolutional code for example, or alternatively a rate ¼ code for the more important bits and a rate ½ code for the less important bits, giving the equivalent of rate ⅓ coding taken on average. Coding and decoding of bits having different perceptual significance is further described in U.S. patent application Ser. No. 08/943,885 (Dent, filed Oct. 3, 1993) by applicant, which is hereby incorporated by reference herein. The coded bits representing one digital speech frame or data packet are interleaved with the previous and next frames and spread over six TDMA bursts separated by 16 timeslots on the downlink from satellite to portable unit. Each successive timeslot is transmitted on a frequency channel selected according to this invention from a set of channels spaced by 200 KHz on the downlink.

The corresponding uplink uses the same interleaving and coding, but the uplink transmissions occur in one of four timeslots on one of four 50 KHZ channels, the four timeslots times four 50 KHz channels being associated with the 16 timeslots of one 200 KHz downlink channel. Thus there are four times as many uplink frequency channels as downlink channels, and one quarter the number of uplink timeslots, making the same number of communications channels altogether where a communications channel is defined as one out of 16 timeslots on a 200 KHz carrier frequency. Since a unique uplink channel (i.e. one of four possible 50 KHz channels and one of four timeslots) is associated with each downlink channel, selection of the downlink timeslot and selection of the 200 KHZ frequency downlink channel according to this invention defines the uplink channel to use in a particular TDMA frame.

In one application, it is desired to spread traffic activity evenly in time and frequency. The frequency-spreading is achieved by the multi-cell frequency hopping method described above. The distribution of traffic in time is equalized by choosing a timeslot to allocate to a call at call set-up according to which of the 16 downlink timeslots in the cell currently is allocated to the fewest calls. Alternatively, the timeslot having the lowest number of calls allocated to it over a group of beams or the entire system-can be assigned, in order to reduce time-variation in the total demand for satellite transmission power. The choice of how large a group of cells to consider in evaluating timeslot activity depends on the allocation of transmitter power amplifiers to beams, whether on a one-to-one basis, or whether all power amplifiers contribute to all beams (as with a phases array) or whether a pool of power amplifiers is shared between a given group of beams as described in U.S. Pat. Nos. 5,631, 604, 5,638,024, 5,574,967, and 5,568,088, which are hereby incorporated by reference herein.

Thus by spreading activity equally in time and frequency on the downlink, traffic is also spread equally in time and frequency on the uplink, because each downlink frequency/time combination maps to a unique uplink frequency/time combination.

Unfortunately due to round trip transmission delay from satellite to earth and back again, uplink frequency selections that were made orthogonally at the ground terminals will not necessarily be received orthogonally at the satellite. In particular, terminals located at one edge of a beam lie at a different distance from the satellite than terminals at the opposite edge, when the satellite is not directly overhead. Thus terminals transmitting in neighboring timeslots on the same frequency as measured in ground time may no longer be transmitting in adjacent slots, but overlapping by the time the signals have propagated through different delays to the satellite. This can be overcome by adjusting the transmit times of ground terminals in dependence on their position in order to ensure that the signals are received in the correct timeslot at the satellite. When it is desired to employ satellite diversity reception, it is more difficult to adjust transmit timing such that signals are non-overlapping at two satellites, and maybe impossible for three. These issues are dealt with in U.S. patent application Ser. No. 08/354,904 which was incorporated by reference above. Using frequency hopping and light channel loading, combined with heavy coding and interleaving however, it is not necessary to ensure that interference does not occur, merely that it occurs with a sufficiently low probability. It would be desirable for example that a clash in frequency and time at two different satellite occurred with independent probability such that the probability of both suffering a clash was squared relative to the probability of a clash at a single satellite.

If frequency hopping was performed, as in GSM, by changing frequency once per TDMA frame and using the same frequency for all timeslots in the same frame, then a timing error causing time overlap between adjacent timeslots of the same frame would also be overlapping in frequency, and this would be a permanent situation. To reduce this event to a random occurrence, a different frequency hopping sequence is used on adjacent timeslots of the uplink. This is ensured by using a different frequency hopping pattern for adjacent slots of the downlink, or at least for slots separated by four slots on the downlink, which map to the same uplink frequency channel. This is easily achieved using this invention by allocating different system keys to the 16 downlink timeslots. Alternatively, different system keys may be allocated to the 32 timeslots comprising an even numbered frame and an odd numbered frame, as when using downlink satellite diversity according to the above incorporated art it is sometimes advantageous to transmit an odd-frame slot from one satellite and an even-frame slot from a different satellite. Thus one set of frequency hopping variables may be allocated to one satellite and a different set to another satellite. Depending on signal quality and loading, a ground terminal can receive and decode only odd frames transmitted using a first frequency hopping sequence from a first satellite, alternatively only even frames transmitted using a second frequency hopping sequence from a second satellite, or yet again can receive both odd and even frames from either the same or different satellites by selecting the appropriate frequency hopping parameters. Thus the random number generators (30,31,32) can, according to this invention, select different system or cell keys and address different Hopsets in memory (10) for receiving slots in even and odd frames respectively. A generalized approach called "satellite hopping" could be used in which a satellite was selected for reception of each signal burst together with a hopset, system key, orthogonal offset or other parameters on which the selection of the frequency channel for that burst would depend.

By use of the inventive frequency hopping methods described above, the need to take special steps to synchronize uplink transmissions to avoid clashes in time and frequency may thus be avoided by reducing these events to a random occurrence of acceptably low probability.

A person skilled in the art can make many adaptations of the above teachings which remain within the scope and spirit of the invention as described by the attached claims.

I claim:

1. A method for selecting a channel for use in connecting a remote station to a radiocommunication system comprising the steps of:
    assigning a set of orthogonal offsets to a cell;
    generating a pseudo-random number;
    pseudo-randomly selecting one of said orthogonal offsets using a value associated with said remote station; and
    combining said pseudo-randomly selected orthogonal offset with said pseudo-random number to generate a channel selection number, wherein said channel selection number will vary pseudo-randomly between said remote station and another remote station operating in another cell having said same set of orthogonal offsets.

2. The method of claim 1, wherein said step of pseudo-randomly selecting further comprises the steps of:
    assigning a unique offset to each remote station in said radiocommunication system; and
    adding said unique offset to a second pseudo-random number to obtain said pseudo-randomly selected offset.

3. A method for frequency hopping in a radiocommunication system comprising the steps of:
    assigning a same set of hopping sequences to a first and second cell; and
    selecting, as between said first and second cells, hopping sequences pseudo-randomly wherein a station in said first cell has a first interferer in said second cell during a first hop interval and a second interferer, different from said first interferer, in said second cell during a second hop interval.

4. The method of claim 3, wherein said step of pseudo-randomly selecting hopping sequences further comprises the steps of:
    generating, in said first cell, a first pseudo-random number based on a first cell key;
    generating, in said second cell, a second pseudo-random number based on a second cell key;
    determining a first offset used to select a first hopping sequence in said first cell using said first pseudo-random number; and
    determining a second offset used to select a second hopping sequence in said second cell using said second pseudo-random number, wherein said first and second hopping sequences are selected pseudo-randomly relative to one another.

5. An apparatus comprising:
    means for assigning a set of orthogonal offsets to a cell;
    means for generating a pseudo-random number;
    means for pseudo-randomly selecting one of said orthogonal offsets using a value associated with said remote station; and
    means for combining said pseudo-randomly selected orthogonal offset with said pseudo-random number to generate a channel selection number, wherein said channel selection number will vary pseudo-randomly between said remote station and another remote station operating in another cell having said same set of orthogonal offsets.

6. The apparatus of claim 5, wherein said means for pseudo-randomly selecting further comprises:
    means for assigning a unique offset to each remote station in said radiocommunication system; and
    means for adding said unique offset to a second pseudo-random number to obtain said pseudo-randomly selected offset.

7. A frequency hopping radiocommunication system comprising:
    means for assigning a same set of hopping sequences to a first and second cell; and
    a sequence selection device for selecting, as between said first and second cells, hopping sequences pseudo-randomly wherein a station in said first cell has a first interferer in said second cell during a first hop interval and a second interferer, different from said first interferer, in said second cell during a second hop interval.

8. The system of claim 7, wherein said sequence selection device further comprises:
    means for generating, in said first cell, a first pseudo-random number based on a first cell key;
    means for generating, in said second cell, a second pseudo-random number based on a second cell key;
    means for determining a first offset used to select a first hopping sequence in said first cell using said first pseudo-random number; and means for determining a second offset used to select a second hopping sequence in said second cell using said second pseudo-random number, wherein said first and second hopping sequences are selected pseudo-randomly relative to one another.

9. A channel selection unit for use in a radiocommunication system comprising:

a first pseudo-random number generator for generating a first random number;

a second pseudo-random number generator for generating a second random number;

a first adder for adding an offset to said second pseudo-random number;

a second adder for adding an output of said first adder and said first pseudo-random number together; and means for addressing a hop sequence memory device using an output of said second adder to select channels.

10. The unit of claim 9, wherein said offset is a value associated with a particular remote station used in said radiocommunication system.

11. The unit of claim 9, wherein said second pseudo-random number is generated based upon an input key value associated with a particular cell of said radiocommunication system.

* * * * *